United States Patent
Gu et al.

(10) Patent No.: US 7,764,501 B2
(45) Date of Patent: Jul. 27, 2010

(54) ELECTRONIC DEVICE

(75) Inventors: Hui-Fang Gu, Shanghai (CN); Tsai-Kuei Cheng, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 12/345,454

(22) Filed: Dec. 29, 2008

(65) Prior Publication Data
US 2010/0124016 A1 May 20, 2010

(30) Foreign Application Priority Data
Nov. 20, 2008 (CN) .................. 2008 1 0176696

(51) Int. Cl.
*H05K 7/20* (2006.01)
(52) U.S. Cl. .................. 361/700; 361/690; 361/692; 174/15.2; 174/16.1; 174/16.3; 165/80.4; 165/104.26
(58) Field of Classification Search .................. None
See application file for complete search history.

(56) References Cited

U.S. PATENT DOCUMENTS

| 5,974,556 | A | * | 10/1999 | Jackson et al. ............... 713/322 |
| 6,084,769 | A | * | 7/2000 | Moore et al. ............ 361/679.47 |
| 6,191,943 | B1 | * | 2/2001 | Tracy .................... 361/679.46 |
| 6,908,323 | B2 | * | 6/2005 | Ice .............................. 439/160 |
| 7,001,217 | B2 | * | 2/2006 | Bright et al. ............. 439/607.2 |
| 7,239,515 | B2 | * | 7/2007 | Bulman-Fleming et al. . 361/704 |
| 7,286,346 | B2 | * | 10/2007 | Chiba et al. ............ 361/679.48 |
| 7,375,967 | B2 | * | 5/2008 | Huang et al. ................. 361/707 |
| 7,472,215 | B1 | * | 12/2008 | Mok et al. ................... 710/304 |
| 7,480,140 | B2 | * | 1/2009 | Hara et al. .................. 361/692 |
| 2008/0137306 | A1 | * | 6/2008 | Kim ........................... 361/709 |

* cited by examiner

*Primary Examiner*—Boris L Chervinsky
(74) *Attorney, Agent, or Firm*—J.C. Patents (57) ABSTRACT

An electronic device including a base and a pluggable unit is provided. The base includes a first heat sink having a first heat-transfer contacting surface. The pluggable unit includes a second heat sink and a heat source. The second heat sink has a second heat-transfer contacting surface. When the pluggable unit is plugged in the base, the first heat-transfer contacting surface gets in contact with the second heat-transfer contacting surface.

15 Claims, 6 Drawing Sheets

ELECTRONIC DEVICE

CROSS-REFERENCE TO RELATED APPLICATION

This application claims the priority benefit of P.R.C. patent application serial no. 200810176696.8, filed on Nov. 20, 2008. The entirety of the above-mentioned patent application is hereby incorporated by reference herein and made a part of specification.

BACKGROUND OF THE INVENTION

1. Field of the Invention

The present invention generally relates to a device, and more particularly, to an electronic device.

2. Description of Related Art

The heat dissipation capability in an electronic device is critical for maintaining the system of the electronic device for stable operation. When the temperature inside the electronic device is overhigh, a breakdown of the electronic device may be caused, and even electronic components inside the electronic device may be damaged. In order to effectively reduce the heat generated during the operation of the electronic device and improve the heat dissipating performance, the electronic device often employs a larger heat sink in the electronic device, or configures air inlets and air outlets at the housing of the electronic device, or evacuates the heated air inside the electronic device out by convection. Further, a fan is often equipped inside the electronic device for introducing a forced convection to strengthen the heat dissipation, so as to avoid damages caused to the electronic device by the overhigh temperature.

However, those electronic devices having smaller volumes or being configured with special structures are often restricted by the volumes and structure thereof, and cannot satisfy the requirement for heat dissipation by adopting usual approaches.

Figure 1:
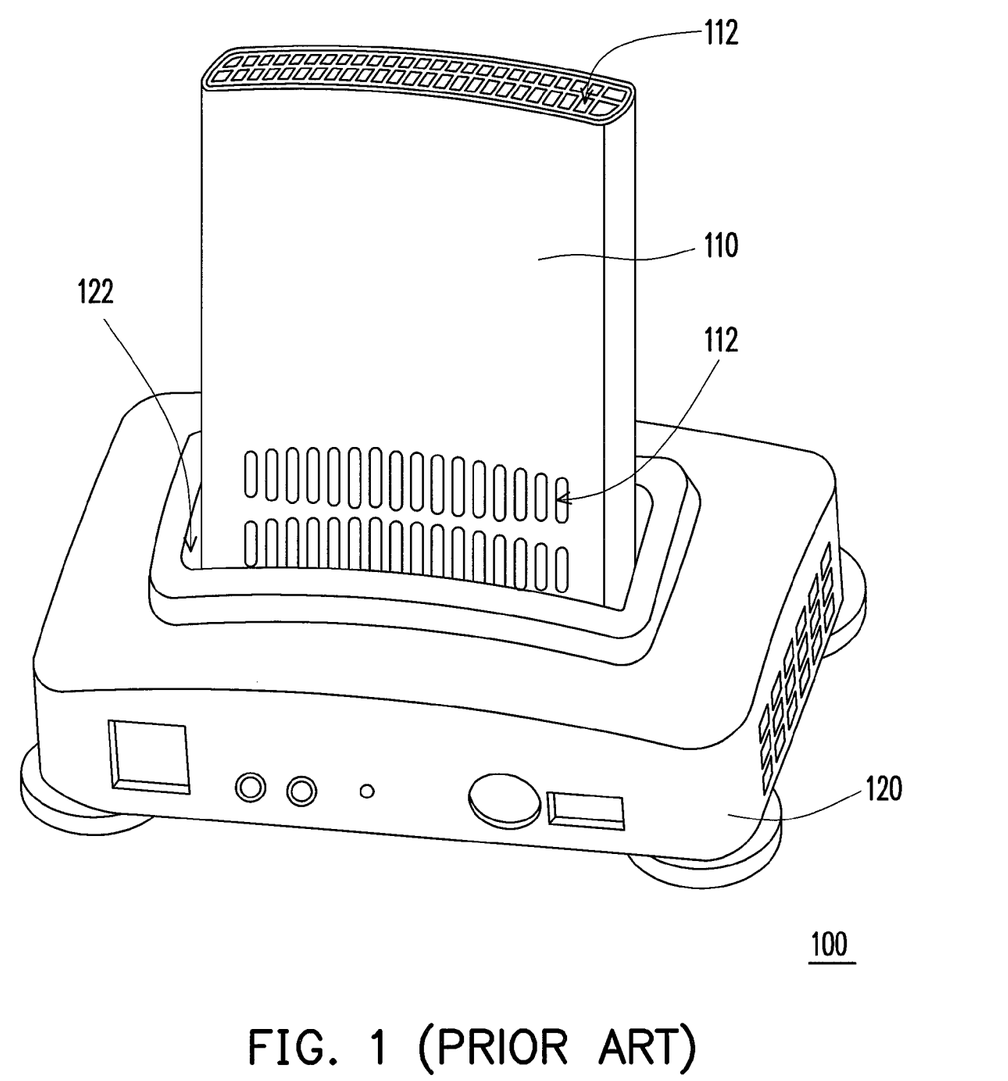
FIG. 1 is an isometric view of a conventional electronic device.

Referring to FIG. 1, it is an isometric view of a conventional electronic device. The conventional electronic device 100 includes a pluggable unit 110 and a base 120. The pluggable unit 110 is typically disposed in a socket 122 of the base 120. When the electronic device is in operation, the pluggable unit 110 generates a lot of heat. However, the pluggable unit 110 is configured with very small size. As such, the pluggable unit 110 can be equipped with a very small heat sink only and cannot be provided with a fan. Therefore, many air inlets and air outlets have to be configured at the housing of the electronic device 100 for strengthening the heat dissipation. However, even doing all of the above, the achieved heat dissipating performance may still fails to satisfy the requirement of the electronic device 100 for heat dissipation. Further, those air inlets and air outlets seriously affect the overall appearance of the electronic device 100, and are often unsatisfactory for the expectation of the client. Even further, for satisfying the heat dissipation specification provided by the client, the electronic device 100 has to be designed with a larger size. Unfortunately, an electronic device having a large size does not match the trend of commercialized electronic devices for slimness and portability, and stays away from the original intension of reducing the size of a component by designing the electronic device 100 in a multi-element manner. As such, it has become an important concern for a multi-element electronic device to achieve a smaller size, a well-built appearance, while maintaining an optimal heat dissipating performance.

SUMMARY OF THE INVENTION

Accordingly, the present invention is directed to provide an electronic device, adapted for improving heat dissipation by oblique contacting.

The present invention provides an electronic device, including a base and a pluggable unit. The base includes a first heat sink having a first heat-transfer contacting surface. The pluggable unit includes a second heat sink and a heat source. The second heat sink has a second heat-transfer contacting surface. When the pluggable unit is plugged in the base, the first heat-transfer contacting surface gets in contact with the second heat-transfer contacting surface.

According to an embodiment of the present invention, the first heat-transfer contacting surface and the second heat-transfer contacting surface are high precision contacting surfaces having a smoothness of 3 microns.

According to an embodiment of the present invention, the first heat-transfer contacting surface and the second heat-transfer contacting surface are oblique planes, so that a greater contacting area therebetween can be achieved.

According to an embodiment of the present invention, the base further includes a first case and a first circuit board. The first case includes a socket. The first circuit board and the first heat sink are disposed inside the first case. Further, the first case includes an upper housing and a lower housing. The socket is positioned in the upper housing of the first case. The upper housing of the first case has a top wall and a plurality of sidewalls. The sidewalls, the top wall and the lower housing of the first case are perpendicularly connected together. The socket is positioned at the top wall. The top wall is configured with a plurality of air outlets, and the sidewalls are configured with a plurality of air inlets. Further, the first circuit board has a surface and a plugging slot configured on the surface. The surface of the first circuit board defines a sharp angle with a surface of the lower housing.

According to an embodiment of the present invention, the first heat sink includes a body, a heat pipe, and a plurality of fins. The heat pipe is arranged surrounding the first circuit board and passing through the body and the fins. The first heat-transfer contacting surface is positioned at the body.

According to an embodiment of the present invention, the pluggable unit further includes a second case and a second circuit board. The second circuit board is disposed in the second case. The heat source is positioned on the second circuit board. Further, the second case includes an upper housing and a lower housing. The second circuit board is positioned between the upper housing and the lower housing of the second case, and the second heat sink is positioned between the second circuit board and the upper housing. Further, the second circuit board is provided with a connector at a side thereof.

According to an embodiment of the present invention, the second heat sink is a heat dissipating plate. The heat dissipating plate includes a bent structure arranged along a profile of the connector. The second heat-transfer contacting surface is positioned at the bent structure.

According to an embodiment of the present invention, a size of the heat dissipating plate is same with a size of the second circuit board.

According to an embodiment of the present invention, the connector of the second circuit board is plugged in the plugging slot of the first circuit board for electrically connecting the first circuit board with the second circuit board.

In the present invention of the electronic device, the first heat-transfer contacting surface of the first heat sink is in contact with the second heat-transfer contacting surface of the second heat sink. In such a way, the heat inside the pluggable unit is dissipated in a conduction manner, by which a better heat dissipating performance than the conventional convection manner can be achieved. Therefore, the first case of the base and the second case of the pluggable unit can be designed with less air inlets and air outlets, so that the electronic device is allowed to achieve a better overall appearance, and requirements of customer is satisfied. Moreover, the present invention employs an oblique contacting architecture of heat-transfer contacting surfaces of heat sinks, thus increasing the contacting area for conducting heat, and further improving the efficiency of heat dissipation. Even further, the size of the second heat sink is designed to be same with the size of the second circuit board, so that the heat from the heat source can be rapidly and evenly dissipated. Therefore, the heat dissipating performance can be improved for satisfying the heat dissipation specification customer provided, thus reducing the overall size of the electronic device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
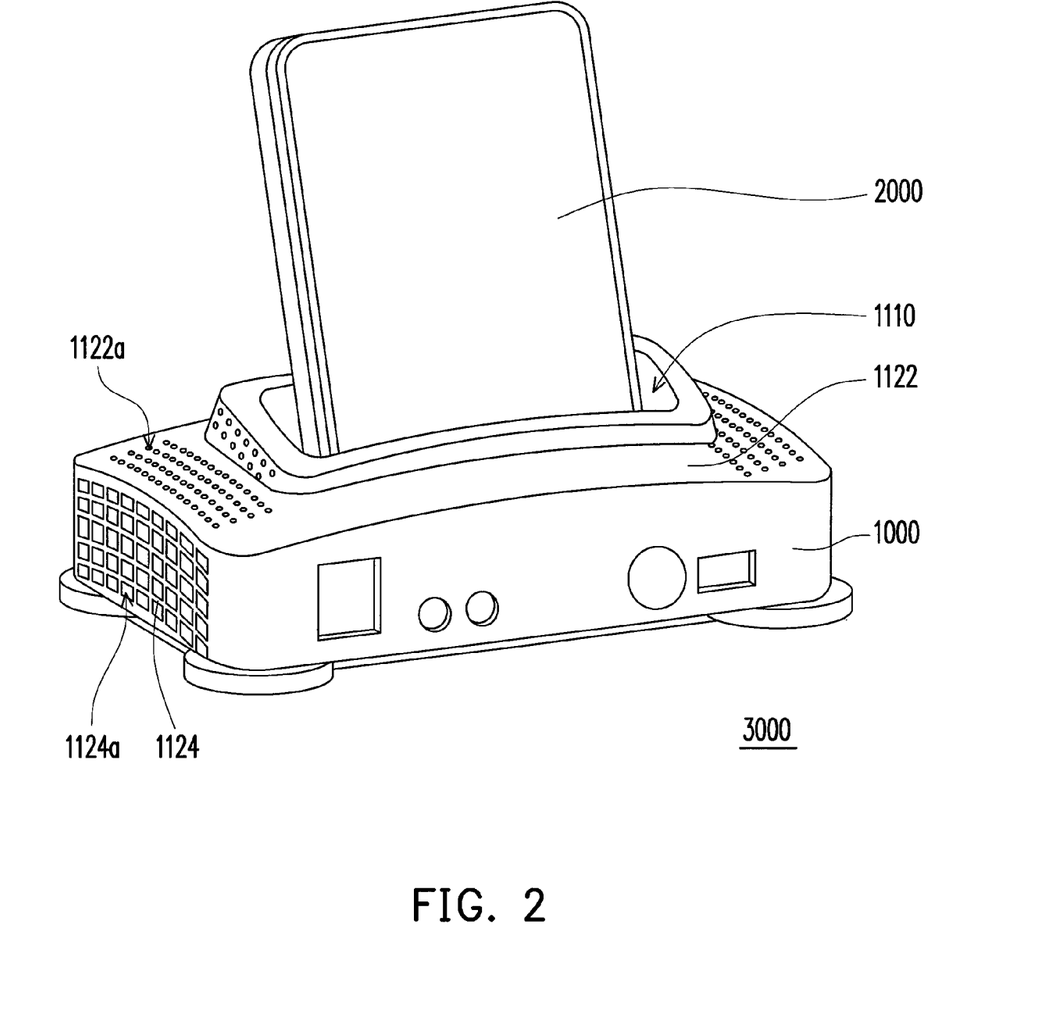
FIG. 2 is an isometric view of an electronic device according to an embodiment of the present invention.
Figure 3:
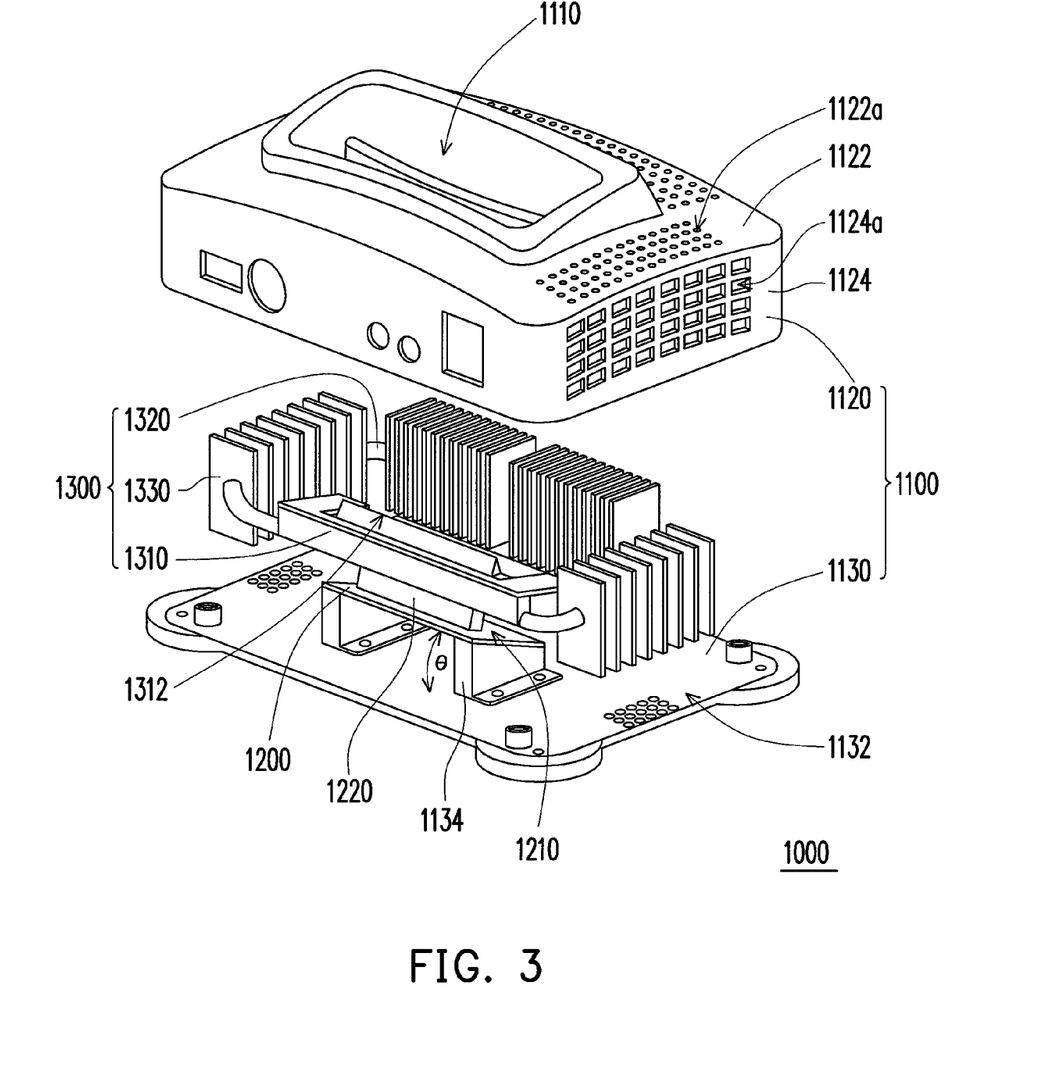
FIG. 3 is an explosive view of a base of FIG. 2.
Figure 4:
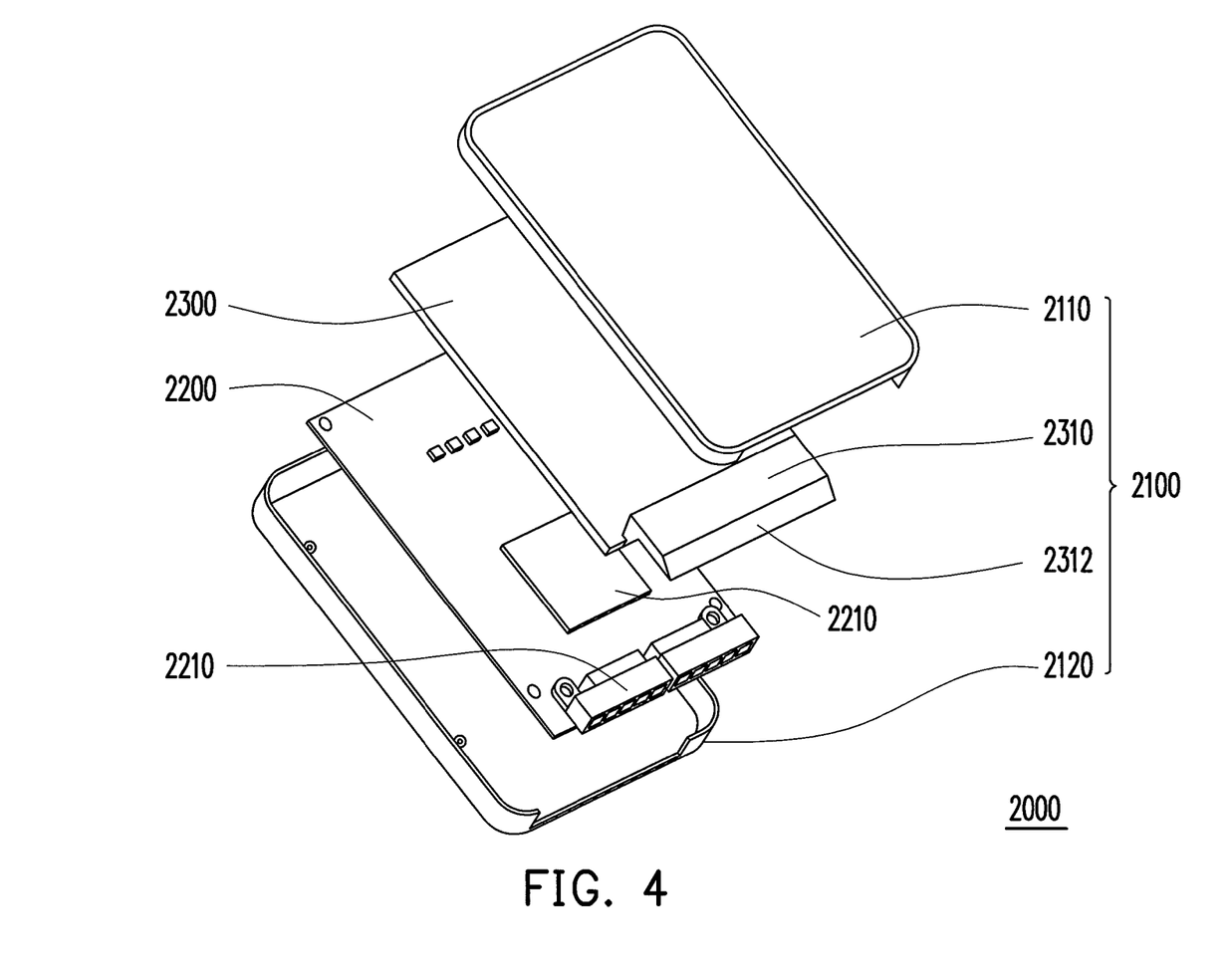
FIG. 4 is an explosive view of a pluggable unit of FIG. 2.

FIG. 2 is an isometric view of an electronic device according to an embodiment of the present invention. FIG. 3 is an explosive view of a base of FIG. 2. FIG. 4 is an explosive view of a pluggable unit of FIG. 2. Referring to FIGS. 2-4 together, an electronic device 3000 includes a base 1000 and a pluggable unit 2000. The base 1000 includes a first case 1100, a first circuit board 1200, and a first heat sink 1300. The first case 1100 includes a socket 1110. The first circuit board 1200 and the first heat sink 1300 are disposed inside the first case 1100. The pluggable unit 2000 for example can be a thin client, including a second case 2100, a second circuit board 2200, and a second heat sink 2300. The second circuit board 2200 and the second heat sink 2300 are disposed in the second case 2100. The second circuit board 2200 includes a heat source 2210.

In the current embodiment, the first heat sink 1300 has a first heat-transfer contacting surface 1312 exposed from the socket 1110. The second heat sink 2300 has a second heat-transfer contacting surface 2312. It should noted that both of the first heat-transfer contacting surface 1312 and the second heat-transfer contacting surface 2312 are high precision surfaces. Here, the high precision surfaces are defined as surfaces having a smoothness of 3 microns. Further, both of the first heat-transfer contacting surface 1312 and the second heat-transfer contacting surface 2312 are oblique planes, so that when the first heat-transfer contacting surface 1312 and the second heat-transfer contacting surface 2312 are in contact, a large contacting area can be achieved therebetween. In such a way, a fast heat conduction therebetween can be achieved.

When the pluggable unit 2000 is plugged in the socket 1110, the first heat-transfer contacting surface 1312 gets in contact with the second heat-transfer contacting surface 2312, and the first circuit board 1200 is electrically connected with the second circuit board 2200. In the current embodiment, the heat source 2210 of the second circuit board 2200 is a chip. In operation, the chip generates heat. Therefore, because both of the first heat-transfer contacting surface 1312 and the second heat-transfer contacting surface 2312 are high precision surfaces, the first heat-transfer contacting surface 1312 and the second heat-transfer contacting surface 2312 are in optimal contact, so that the heat of the pluggable unit 2000 can be fast conducted via the second heat sink 2312 to the base 1000 for dissipating thereby. Such a top-down transferring manner as illustrated above, is adapted not only for dissipating the heat inside the pluggable unit 2000 from the base 1000, but also for reducing the volume of the pluggable unit 2000 with a similar heat dissipating performance is achieved. Further, in such a way, the pluggable unit 2000 may even carry out an improved heat dissipating performance without configuring holes for heat dissipation, thus achieving a better overall appearance.

In details, the first case 1100 includes an upper housing 1120, and a lower housing 1130. The upper housing 1120 includes a top wall 1122, and a plurality of sidewalls 1124. The top wall 1122 of the upper housing 1120 is parallel with the lower housing 1130, and the sidewalls 1124 are substantially perpendicularly connected with the top wall 1122 and the lower housing 1130. Further, the socket 1110 is positioned at the top wall 1122 of the upper housing 1120. The top wall 1122 is configured with a plurality of air outlets 1122a, and the sidewalls 1124 are configured with a plurality of air inlets 1124a. Further, the first circuit board 1200 has a surface 1210 and a plugging slot 1220 configured on the surface 1210. The surface 1210 of the first circuit board 1200 defines a sharp angle θ with a surface 1132 of the lower housing 1130. Specifically, the first circuit board 1200 is locked by a screw on two oblique blocks 1134 of the lower housing 1130, so as to maintain an oblique angle of the first circuit board 1200 relative to the lower housing 1130.

The first heat sink 1300 includes a body 1310, a heat pipe 1320, and a plurality of fins 1330. The heat pipe 1320 is arranged surrounding the first circuit board 1200 and passing through the body 1310 and the fins 1330. The first heat-transfer contacting surface 1312 is positioned at the body. In the current embodiment, the heat pipe 1320 for example is fixed to the body 1310 by welding. However, the scope of the present invention is not restricted as fixing the heat pipe 1320 to the body by welding only. In other embodiments, the heat pipe 1320 can also be fixed to the body 1310 by other approaches. The fins 1330 are arranged one spaced from another and encircling the heat pipe 1320. However, in accordance with the practical requirement, the arrangement, the shape and the amount of the fins 1330 can be varied as desired.

The second case 2100 includes an upper housing 2110 and a lower housing 2120. The second heat sink 2300 is disposed between the second circuit board 2200 and the upper housing 2110, and in contact with the heat source 2210 of the second circuit board 2200. Further, the second circuit board 2200 is provided with a connector 2220 at a side thereof. The connector 2220 is adapted for plugging in the plugging slot 1220 of the first circuit board 1200, for electrically connecting the first circuit board 1200 with the second circuit board 2200. When the connector 2220 of the second circuit board 2200 is plugged in the plugging slot 1220 of the first circuit board 1200, the pluggable unit 2000 is obliquely arranged relative to the base 1000. However, in other embodiment of the present invention, the first circuit board 1200 can also be parallel disposed on the surface 1132 of the lower housing 1130, allowing the connector 2220 of the second circuit board 2200 to be connected with the plugging slot 1220 of the first circuit board 1200.

Further, the second heat sink 2300 for example is a heat dissipating plate having a size being same or equivalent with a size of the second circuit board 2220. Here, the "equivalent" means the size of the heat dissipating plate can be slightly greater than or smaller than the size of the second circuit board 2220. Therefore, the heat of the heat source 2210 can be fastly transferred to the heat dissipating plate. Further, the heat can be evenly distributed over the second heat sink 2300 by heat radiation. Furthermore, the heat dissipating plate includes a bent structure 2310 arranged along a profile of the connector 2220. The second heat-transfer contacting surface 2312 is positioned at the bent structure 2310. The heat sink 2300 for example is made of copper or other materials having a good thermal conductivity. However, in other embodiments, the heat dissipating plate is not required for necessarily including such a bent structure 2310, and it may be directly configured with an oblique surface for achieving a similar heat dissipating performance.

Figure 5:
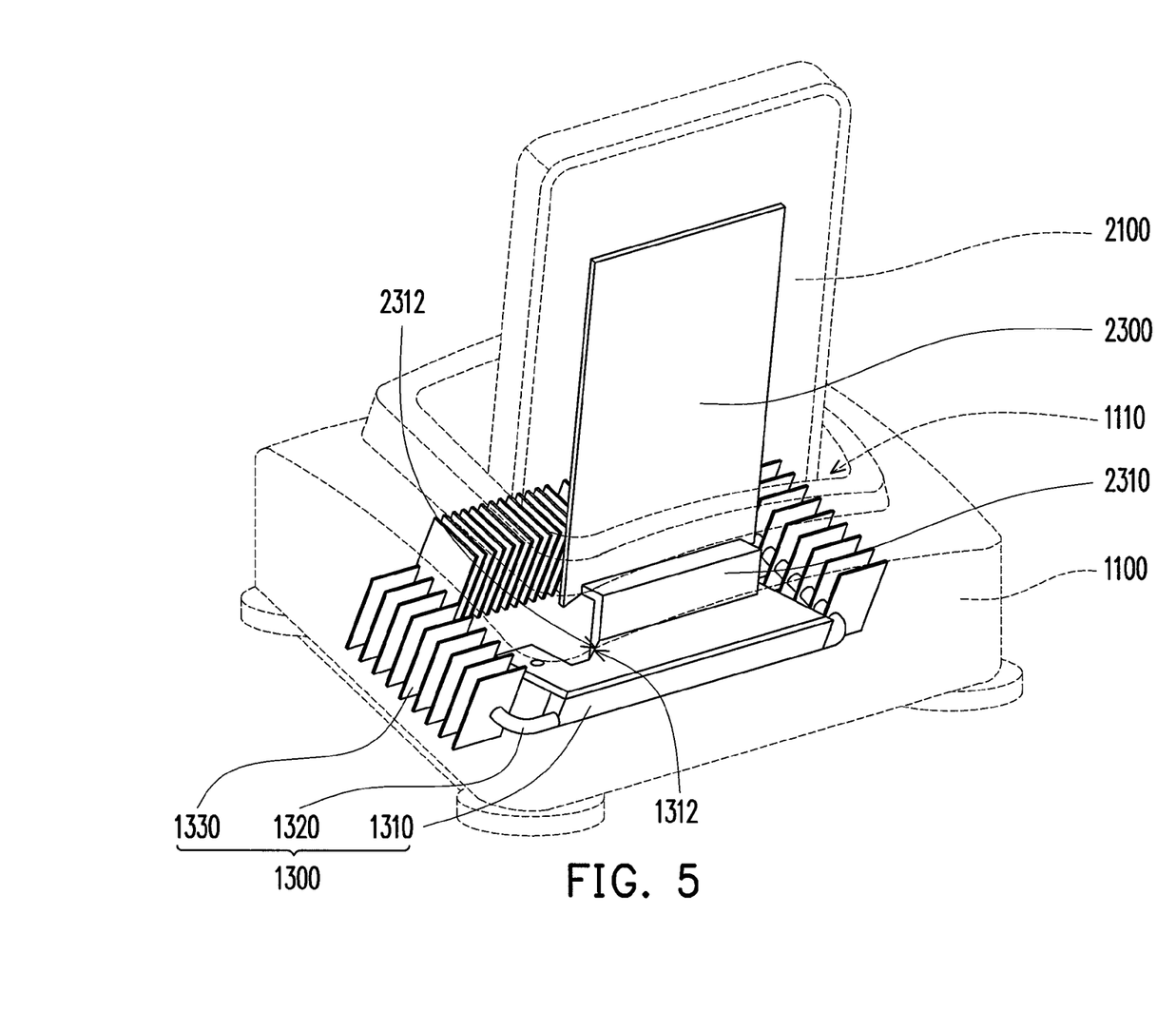
FIG. 5 is a schematic diagram illustrating the first heat-transfer contacting surface and the second heat-transfer contacting surface of FIG. 2 being in contact with each other.

FIG. 5 is a schematic diagram illustrating the first heat-transfer contacting surface and the second heat-transfer contacting surface of FIG. 2 being in contact with each other. Referring to FIGS. 3-5 together, when the pluggable unit is plugged in the base 1000, the second circuit board 2200 is inserted through the socket 1110 of the first case 1100 and is plugged in the plugging slot 1220 of the first circuit board, thus getting in electrical connection with the first circuit board 1200. Meanwhile, the first heat-transfer contacting surface 1312 of the first heat sink 1300 gets in contact with the second heat-transfer contacting surface 2312 of the second heat sink 2300. The heat source 2210 of the second circuit board 2200 of the pluggable unit 2000 generates heat. Then, because the first heat-transfer contacting surface 1312 and the second heat-transfer contacting surface 2312 are in optimal and close contact, the heat generated by the heat source 2210 of the pluggable unit 2000 can be fastly transferred toward the base 1000 in a way of heat conduction. The pluggable unit 2000 is not provided with any heat dissipation holes thereon, and therefore heated air in the base 1000 can fastly flow into first case 1100 or flow out from the first case 1100 via the air outlets 1122a configured at the top wall 1122 and the air inlets 1124a configured at the sidewalls 1124, thus configuring a heat convection. In such a way, the heat inside the electronic device 3000 can be effectively evacuated therefrom so as to maintain the well operation of the electronic device 3000. Comparing to the conventional technology, the present invention employs an oblique contacting between the first heat-transfer contacting surface 1312 and the second heat-transfer contacting surface 2312, thus increasing the contacting area for heat conduction. Further, the heat inside the electronic device 3000 can be dissipated by conduction, radiation, and convection at the same time, and therefore a better heat dissipating efficiency is achieved. Facilitated with the heat pipe 1320 and the fins 1330, heat dissipating efficiency of the electronic device 3000 is further improved.

Figure 6:
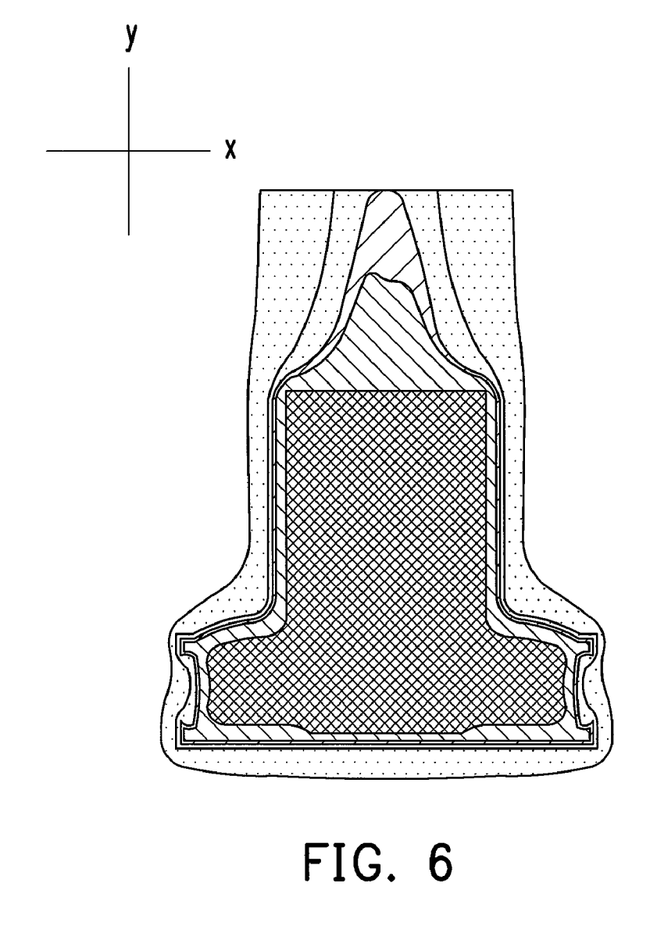
FIG. 6 is a diagram depicting a temperature distribution at Y-direction when the electronic device of the embodiment of FIG. 2 is in operation.
Figure 7:
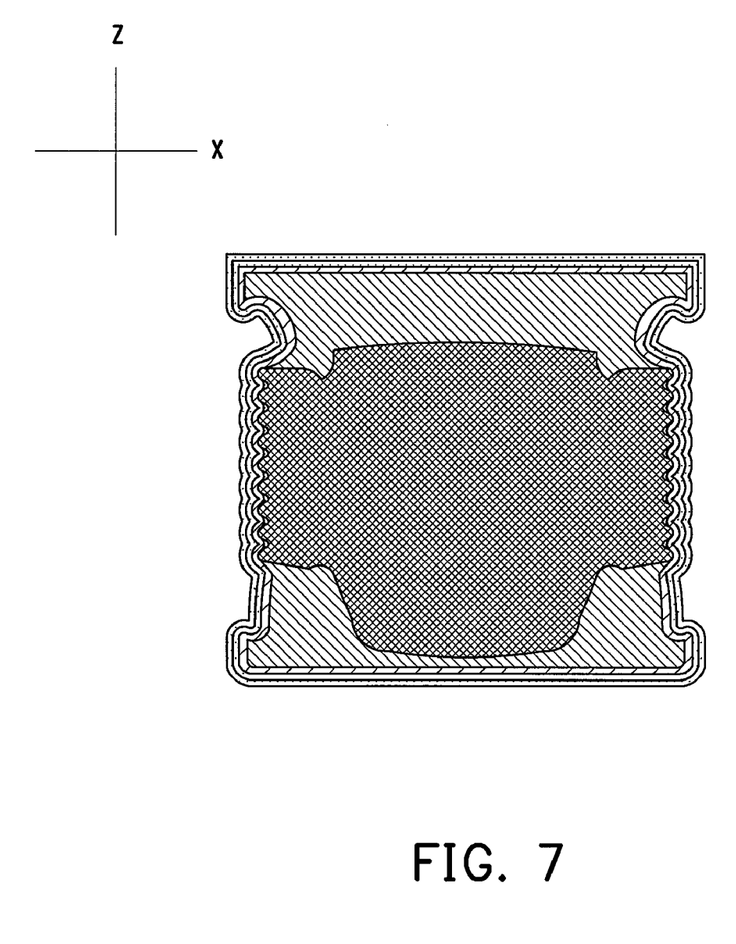
FIG. 7 is a diagram depicting a temperature distribution at XZ plane when the electronic device of the embodiment of FIG. 3 is in operation.

Assuming that the electronic device 3000 has an overall heating power of 9.18 W, the pluggable unit 2000 may share 7.14 W of heat source therearound. FIG. 6 is a diagram depicting a temperature distribution at Y-direction when the electronic device of the embodiment of FIG. 2 is in operation. FIG. 7 is a diagram depicting a temperature distribution at XZ plane when the electronic device of the embodiment of FIG. 3 is in operation. In FIGS. 6 and 7, a higher density of virtual heat lines distribution represents a higher temperature and a lower density of virtual heat lines distribution represents a lower temperature. As shown in FIGS. 6 and 7, the heat of the pluggable unit 2000 can be evenly distributed over the second heat sink 2300 by heat radiation. Then, because of the optimal and close contacting between the first heat-transfer contacting surface 1312 and the second heat-transfer contacting surface 2312, the heat of the pluggable unit 2000 can be transferred to the base 1000 by heat conduction. The base 1000 dissipates the heat by heat convection. As such, with respect to the practical heat distribution, the temperature distribution at the Y-direction is mainly concentrated at the area where the pluggable unit 2000 gets in connection with the base 1000. In other words, the heat of the pluggable unit 2000 can be effectively top-down transferred to the base 1000, and then evacuated out by the air outlets 1122a and the air inlets 1124a.

Briefly, in the electronic device of the present invention, the first heat-transfer contacting surface of the first heat sink is in contact with the second heat-transfer contacting surface of the second heat sink. In such a way, the heat inside the pluggable unit is firstly and fastly conducted to the base, and then the heat accumulated in the base is evacuated out by convection via the air outlets configured at the top wall for heat dissipation. Such a top-down transferring manner as illustrated above, is adapted for dissipating the heat inside the pluggable unit from the base without configuring heat dissipation holes on the pluggable unit, thus achieving a better overall appearance required by the clients. Moreover, the present invention configures the size of the second heat sink equivalent with the circuit board and configures the heat-transfer contacting surfaces as oblique planes, thus increasing the contacting area for conducting heat and the heat dissipation area, and further improving the efficiency of heat dissipation. Therefore, the size of the pluggable unit is smaller for slimness and a better portability.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
   a base, comprising a first heat sink having a first heat-transfer contacting surface; and
   a pluggable unit comprising a second heat sink and a heat source, and the second heat sink having a second heat-transfer contacting surface and a bent structure, wherein the second heat-transfer contacting surface is positioned at the bent structure, wherein when the pluggable unit is plugged in the base, the first heat-transfer contacting surface gets in contact with the second heat-transfer contacting surface.

2. The electronic device according to claim 1, wherein the first heat-transfer contacting surface and the second heat-transfer contacting surface are high precision contacting surfaces.

3. The electronic device according to claim 2, wherein the high precision contacting surfaces have a smoothness of 3 microns.

4. The electronic device according to claim 1, wherein the first heat-transfer contacting surface and the second heat-transfer contacting surface are oblique planes for increasing a contacting area therebetween.

5. The electronic device according to claim 1, wherein the base further comprises a first case and a first circuit board, the first case comprises a socket, and the first circuit board and the first heat sink are disposed inside the first case.

6. The electronic device according to claim 5, wherein the first case comprises an upper housing and a lower housing, and the socket is positioned in the upper housing of the first case.

7. The electronic device according to claim 6, wherein the upper housing of the first case has a top wall and a plurality of sidewalls, the sidewalls and the top wall are perpendicularly connected to the lower housing of the first case, the socket is positioned at the top wall, the top wall is configured with a plurality of air outlets, and the sidewalls are configured with a plurality of air inlets.

8. The electronic device according to claim 6, wherein the first circuit board has a surface and a plugging slot configured on the surface, and the surface of the first circuit board defines a sharp angle with a surface of the lower housing.

9. The electronic device according to claim 1, wherein the first heat sink comprises a body, a heat pipe, and a plurality of fins, the heat pipe being arranged surrounding the first circuit board and passing through the body and the fins, and the first heat-transfer contacting surface being positioned at the body.

10. The electronic device according to claim 1, wherein the pluggable unit comprises a second case and a second circuit board, the second circuit board being disposed in the second case, and the heat source being positioned on the second circuit board.

11. The electronic device according to claim 10, wherein the second case comprises an upper housing and a lower housing, the second circuit board being positioned between the upper housing and the lower housing of the second case, and the second heat sink being positioned between the second circuit board and the upper housing of the second case.

12. The electronic device according to claim 11, wherein the second circuit board comprises a connector at a side of the second circuit board.

13. The electronic device according to claim 12, wherein the second heat sink is a heat dissipating plate comprising the bent structure, and the bent structure is arranged along a profile of the connector.

14. The electronic device according to claim 13, wherein a size of the heat dissipating plate is same with a size of the second circuit board.

15. The electronic device according to claim 12, wherein the connector of the second circuit board is plugged in the plugging slot of the first circuit board for electrically connecting the first circuit board with the second circuit board.

* * * * *